United States Patent
Salyers et al.

(10) Patent No.: US 9,473,556 B1
(45) Date of Patent: Oct. 18, 2016

(54) CONTENT DISCOVERY USING DESCRIPTION SEQUENCES

(71) Applicant: IMDB.com, Inc., Seattle, WA (US)

(72) Inventors: Tanya Salyers, Seattle, WA (US); Scott Thomas Moran, Seattle, WA (US); Yann Thierry Oehl, Seattle, WA (US); Hilliard Bruce Siegel, Seattle, WA (US)

(73) Assignee: IMDb.com, Inc., Seattle, WA (US)

( * ) Notice: Subject to any disclaimer, the term of this patent is extended or adjusted under 35 U.S.C. 154(b) by 664 days.

(21) Appl. No.: 13/920,850

(22) Filed: Jun. 18, 2013

(51) Int. Cl.
| | |
|---|---|
| *G06F 15/16* | (2006.01) |
| *H04L 29/08* | (2006.01) |
| *H04N 21/482* | (2011.01) |
| *G06F 17/30* | (2006.01) |
| *H04N 21/262* | (2011.01) |

(52) U.S. Cl.
CPC ......... *H04L 67/02* (2013.01); *G06F 17/30029* (2013.01); *G06F 17/30053* (2013.01); *G06F 17/30772* (2013.01); *H04N 21/26258* (2013.01); *H04N 21/4825* (2013.01)

(58) Field of Classification Search
USPC ........................................................ 709/204
See application file for complete search history.

(56) References Cited

U.S. PATENT DOCUMENTS

| | | | | |
|---|---|---|---|---|
| 2011/0288970 | A1* | 11/2011 | Kidron | G06Q 30/02 709/219 |
| 2013/0246522 | A1* | 9/2013 | Bilinski | H04N 21/4825 709/204 |
| 2013/0262616 | A1* | 10/2013 | Kim | H04L 29/08549 709/214 |
| 2014/0156645 | A1* | 6/2014 | Brust | G06F 17/30554 707/722 |
| 2014/0207911 | A1* | 7/2014 | Kosmach | H04L 67/02 709/218 |
| 2014/0229894 | A1* | 8/2014 | Vinna | G06F 17/30772 715/810 |
| 2014/0282772 | A1* | 9/2014 | Chen | H04N 21/26258 725/97 |
| 2014/0344693 | A1* | 11/2014 | Reese | G06F 3/0482 715/719 |

* cited by examiner

*Primary Examiner* — Richard G Keehn
(74) *Attorney, Agent, or Firm* — Thomas Horstemeyer, LLP (57) ABSTRACT

Disclosed are various embodiments for a content discovery application. Content items can be selected by first selecting a sequence of descriptors. The descriptors are selected from a subset of descriptors regenerated based on previously selected descriptors and other factors. The content item is selected from a pool of content items responsive to the sequence of descriptors. Users may explore data derived from sequences of descriptors and selected content items from other users to discover content relevant to their interests.

21 Claims, 8 Drawing Sheets

CONTENT DISCOVERY USING DESCRIPTION SEQUENCES

BACKGROUND

Content may be associated with various descriptors. Descriptors may include keywords, nodes of a taxonomy, user-provided descriptions, or other data. Accessing content by selecting these descriptors may be complicated by a large data set of descriptors. The set of descriptors presented to a user for selection should be refined to increase the likelihood of the user discovering relevant content.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Large amounts of content are available for a user to discover. Collections of books, movies, music, or other content may contain thousands of items, making it difficult for a user to discover relevant content. The content items may be associated with various descriptors used for description or categorization. For example, a content item may be tagged with various keywords. A taxonomy node to which the content item belongs may also comprise an identifier or other descriptor relevant to the item. The content item may also be placed into a list or other categorization which has a title or description from which the descriptors may be derived.

By selecting these descriptors, a user may be presented with content responsive to the selected descriptors. When the data set of descriptors is large, the process of discovering relevant content is further complicated as the user must then select the most relevant descriptors. The user should be presented with the most relevant subset of descriptors from which a selection can be made.

A content discovery application may generate weights for the various descriptors based on a frequency of selection, a sequence of already selected descriptors, or other data. The content discovery application may then present the user with a subset of the descriptors based on the weights. After selecting one of the descriptors, the selected descriptor may be added to a sequence of descriptors. The subset of descriptors presented to the user may be then regenerated based on newly calculated weights. After the sequence of descriptors satisfies a predefined condition, the user may then be presented with a collection of content items responsive to the descriptors in the sequence. A content item may then be selected by the user.

By aggregating descriptor sequences and selected content items, the content discovery application may generate further recommendations to a user and generate useful data points for the user. When presented with a subset of the descriptors, the content discovery application may indicate to the user which descriptors were selected by other users during a generation of a respective descriptor sequence. A user may also be presented with descriptor sequences and selected content items for other users to expose relevant content and new sequences of descriptors for the user to input. A user may also be presented with descriptor sequences that resulted in a selection of a content item also selected by a user. The content discovery application may also identify other users who have selected the same descriptors or similar descriptor sequences as a user, thereby indicating similar interests.

In the following discussion, a general description of the system and its components is provided, followed by a discussion of the operation of the same.

Figure 1:
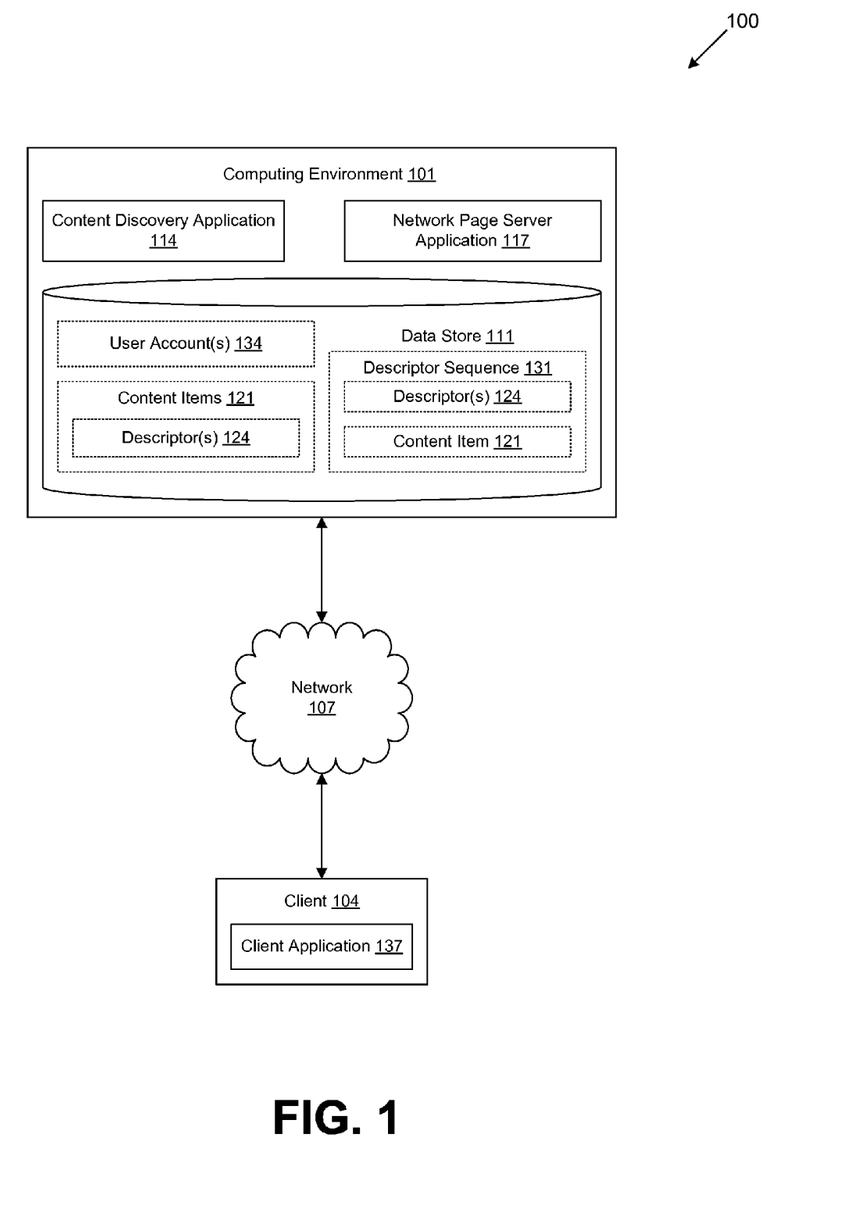
FIG. 1 is a drawing of a networked environment according to various embodiments of the present disclosure.

With reference to FIG. 1, shown is a networked environment 100 according to various embodiments. The networked environment 100 includes a computing environment 101, and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include a content discovery application 114, a network page server application 117, and other applications, services, processes, systems, engines, or functionality not discussed in detail herein. The content discovery application 114 is executed to facilitate the discovery of content items 121 and other data relevant to a user of the client 104. To this end, the content discovery application 114 repeatedly communicates subsets of descriptors 124 associated with a collection of content items 121 to a client 104. The content discovery application 114 then obtains a selection of a descriptor 124 from the client 104 after communicating each of the subsets of descriptors 124, thereby generating a descriptor sequence 131.

The content discovery application 114 may be further configured to communicate to the client 104 a subset of the content items 121 responsive to the descriptor sequence 131. A selection of one of the communicated content items 121 may then be obtained from the client 104 via the network 107. The content discovery application 114 may also be configured to generate other data based on aggregated descriptor sequences 131 and corresponding selected content items 121 as will be described further.

The network page server application 117 is configured to generate network pages such as web pages or other network content for communication to a client 104. The network page server application 117 may generate such network pages to facilitate the content discovery application 114 in communicating data to a client 104.

The data stored in the data store 111 includes, for example, content items 121, descriptor sequences 131, user accounts 134, and potentially other data. Content items 121 are representative of content discoverable by a user of a client 104. Content items 121 may comprise, for example, media items such as audio items, video items, audiovideo items, eBooks or text items, or other media as can be appreciated. Content items 121 may also comprise data entries which describe media or other content relevant to a user. For example, content items 121 may comprise data entries corresponding to movies, music, or other types of media. Content items 121 may also comprise other data.

Content items 121 are associated with descriptors 124. Descriptors 124 comprise a text or string representation of a description applied to the corresponding content item 121. For example, descriptors 124 may comprise keywords, tags, or other attributes indicated as being applicable to the corresponding content item 121. Such descriptors 124 may be provided by system administrators, curators, or users of the content discovery application 114 or related functionality.

Such descriptors 124 may also be generated from lists or categories into which the content items 121 have been grouped. For example, in embodiments in which the content items 121 have been organized into a taxonomy, the descriptors 124 may correspond to identifiers or other data derived from the taxonomy nodes with which a content item 121 is associated. As another example, the descriptors 124 may be derived from user-generated lists into which the content items 121 are grouped. For example, a movie content item 121 may be grouped into a user-generated list for "Top Ten Vampire Horror Movies." Descriptors 124 corresponding to "Vampire," "Horror," or other content of the list title may then be generated for the movie content items 121 included in the list. Descriptors 124 may also be associated with content items 121 by another approach.

Descriptor sequences 131 indicate an ordered progression of descriptors 124 as selected by a user. Descriptor sequences 131 may also be associated with a content item 121 selected by a user from a pool of content items 121 which are responsive to the descriptor sequence 131.

User accounts 134 comprise data accessible to a client 104 to facilitate access to the functionality of the content discovery application 114. To this end, user accounts 134 may comprise user preferences or other personalizations upon which content communicated to the client 104 is selected. User accounts 134 may also associate together one or more descriptor sequences 131 selected by the same user. User accounts 134 may also be associated with other user accounts 134 via a social network or other relationship model. Additionally, user accounts 134 may comprise Application Program Interface (API) keys, authentication credentials, or other data to access additional services via the network 107. For example, the user accounts 134 may comprise authentication credentials for a social networking platform accessed by a user associated with the user account 134, thereby allowing the content discovery application 114 to obtain relevant data from the social networking platform. User accounts 134 may also comprise other data.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 137 and/or other applications. The client application 137 may be executed in a client 104, for example, to access network content served up by the computing environment 101 and/or other servers. To this end, the client application 137 may comprise, for example, a browser, a dedicated application, etc., which may render a user interface comprising a network page, an application screen, etc. The client 104 may be configured to execute applications beyond the client application 137 such as, for example, email applications, social networking applications, word processors, spreadsheets, and/or other applications.

Next, a general description of the operation of the various components of the networked environment 100 is provided. To begin, the content discovery application 114 obtains a descriptor sequence 131 from a client 104. This may involve the content discovery application 114 repeatedly generating a subset of descriptors 124 for communication to a client 104, from which a descriptor 124 is selected and added to the descriptor sequence 131. Generating the subset of descriptors 124 may comprise calculating a weight for each of the descriptors 124, and selecting those of the descriptors 124 whose weight meets or exceeds a threshold.

The weight for a descriptor 124 may calculated based at least in part on a frequency of selection of the descriptor 124 by other users of the content discovery application 114. The weight for a descriptor 124 may also be calculated as a function of a degree of popularity of a list or other content from which the descriptor 124 was generated. For example, a descriptor 124 for "Japanese Monster Movies" generated from a popular user-created list of "Most Influential Japanese Monster Movies" grouping movie content items 121 may receive a higher weight than a descriptor 124 generated from a less popular list. Popularity for user-created content may be determined as a function of a user rating, view or browsing counts, social media sharing, links or references to the user-created content, or other data.

In some embodiments, the weights for descriptors 124 may be recalculated after a descriptor sequence 131 being generated comprises one or more descriptors 124. For example, after one descriptor 124 has been added to a descriptor sequence 131, the weights for the pool of descriptors 124 are then recalculated so that a new subset of descriptors 124 may be communicated to the client 104. In such an embodiment, the weights for a descriptor 124 may be calculated based at least in part on the current state of the descriptor sequence 131.

This may comprise assigning a higher weight to those descriptors 124 more frequently selected to be the next descriptor 124 in the descriptor sequence 131. For example, a descriptor 124 for "Comedy" may be more frequently selected than a descriptor 124 for "Tragedy" by a user who previously added a descriptor 124 "Animated" to a descriptor sequence 131. Therefore, the descriptor 124 "Comedy" will receive a higher weight than the descriptor 124 "Tragedy" when being considered for addition to a descriptor sequence 131 comprising the descriptor 124 "Animated." Weights for descriptors 124 may also be calculated by another approach.

The subset of descriptors 124 may also be generated based at least in part on user preferences indicated in a user account 134 associated with the client 104. For example, the user preferences may indicate one or more descriptors 124 to be filtered from the subsets of descriptors 124 communicated to the client 104. The subset of descriptors 124 may also be generated by other approaches.

After generating the subset of descriptors 124, the content discovery application 114 communicates the subset of descriptors 124 to a client 104. This may comprise encoding for rendering a user interface comprising graphical representations of the descriptors 124 in the subset. In some embodiments, the graphical representations may further comprise an indicator of the corresponding descriptor 124 having been selected by another user. The other user may be associated with the user of the client 104 via a social network, social messaging service, or other relationship model as can be appreciated.

The indicator may be included in the graphical representation of the descriptor 124 responsive to that descriptor 124 having been added to a descriptor sequence 131 having a component matching at least a portion of the state of the currently generated descriptor sequence 131. For example, a current descriptor sequence 131 may comprise the descriptors 124 "Comedy" and "Classic." The subset of the descriptors 124 communicated to the client 104 may comprise the descriptors "Animated" and "Live-Action." An indicator on the graphical representation for the descriptor 124 "Animated" would indicate that another user selected the descriptor 124 "Animated" for addition to another descriptor sequence 131 beginning with the descriptors 124 "Comedy" and "Classic." The subset of descriptors 124 may also be communicated to the client 104 by another approach.

The content discovery application 114 then obtains a selection of one of the descriptors 124 for addition to the descriptor sequence 131. The content discovery application 114 then calculates new weights for the pool of descriptors 124 and generates a new subset of descriptors 124 for communication to the client 104. The content discovery application 114 repeats the process of generating and communicating subsets of descriptors 124 to the client 104 and adding a selected descriptor 124 to a descriptor sequence 131 until a predefined condition is satisfied.

The predefined condition may comprise the descriptor sequence 131 having a number of descriptors 124 meeting or exceeding a size threshold. In other embodiments, the predefined condition may comprise a number of content items 121 responsive to the descriptor sequence 131 falling below a threshold. This indicates that the set of content items 121 responsive to the descriptor sequence 131 is small enough that a relevant content item 121 can be easily selected by the user of the client 104. The predefined condition may also comprise other criteria.

In one embodiment, once the predefined condition is satisfied, the content discovery application 114 generates a subset of the content items 121 which are responsive to the descriptors 124 of the generated descriptor sequence 131. The subset of content items 121 responsive to the descriptors 124 are those of the content items 121 who are associated with the each of the descriptors 124 included in the generated descriptor sequence 131.

The content discovery application 114 then communicates the subset of content items 121 to the client 104. This may comprise encoding for rendering a user interface comprising graphical elements corresponding to the content items 121 in the subset. Graphical elements may comprise images, rendered text, user interface components such as buttons, or other graphical elements. As was described above with respect to graphical elements corresponding to descriptors 124, graphical elements corresponding to content items 121 may comprise an indicator that the content item 121 was selected by another user responsive to a descriptor sequence 131 matching at least a portion of the descriptor sequence 131 of the client 104. The subset of content items 121 may also be communicated by another approach.

In some embodiments, the content discovery application 114 may repeatedly communicate a subset of the content items 121 which are responsive to the descriptors 124 of a current state of the descriptor sequence 131 as descriptors 124 are selected by a user of the client 104. In such an embodiment, the predefined condition indicating the end of the descriptor sequence 131 may comprise a selection of one of the subset of the content items 121.

The content discovery application 114 may then obtain a selection of one of the subset of content items 121 from the client 104, thereby associating the selected content item 121 with the generated descriptor sequence 131. Selecting a content items 121 may also initiate other interactions with the content discovery application 114 or other functionality accessible via the network 107. For example, the selected content item 121 may be added to a list or other grouping of content items 121 associated with a user account 134 associated with the client 104. The selected content item 121 may also be added to a shopping cart or wish list of an electronic commerce system in communication with the content discovery application 114, or initiate a purchase or rental of the selected content item 121 with respect to the electronic commerce system. Selecting the content item 121 may also initiate a download or stream of the selected content item 121 to the client 104 or other devices. Other actions may also be initiated by selecting the content item 121.

In some embodiments, the content discovery application 114 may communicate to a client 104 data which is representative of other user interactions with the content discovery application 114. For example, a user of a client 104 may be explicitly linked with other users of the content discovery application 114 via a social graph, social network, or by another approach. The user of a client 104 may also be linked with other users via relationships derived by the content discovery application 114. For example, users may be related by having similar interests indicated by the users having rated or reviewed similar content items 121, creating similar lists or other user generated content including related content items 121, or by another approach.

The content discovery application 114 may encode for rendering a user interface to allow a user of the client 104 to select another user. The content discovery application 114 may then communicate a descriptor sequence 131, a corresponding selected content item 121, or other data associated with the selected user to the client 104.

In another embodiment, the content discovery application 114 may obtain a selection of a content item 121 which was previously selected by a user of the client 104 after generating a corresponding descriptor sequence 131. The content discovery application 114 may then communicate to the client 104 a descriptor sequence 131 distinct from the one generated by the user associated with the client 104 which also resulted in a selection of the content item 121 by another user. The distinct descriptor sequence 131 may be selected from those descriptor sequences 131 generated by users associated with the user of the client 104, or from the entirety of users.

This allows the user of the client 104 to discover other descriptors 124 and descriptor sequences 131 relevant to their interests. Additionally, the content discovery application 114 may communicate a recommendation to the client 104 for a content item 121 responsive to the distinct descriptor sequence 131. Other actions may also be performed in response to a selection of a previously selected content item 121.

The content discovery application 114 may also obtain from a client 104 a selection of a descriptor 124. The content discovery application 114 may then determine which users associated with the user of the client 104 previously selected the descriptor 124 in generating descriptor sequences 131. This allows the user of the client 104 to discover which users share similar interests. Other actions may also be performed in response to obtaining a selection of a descriptor 124 from a client 104.

Figure 2:
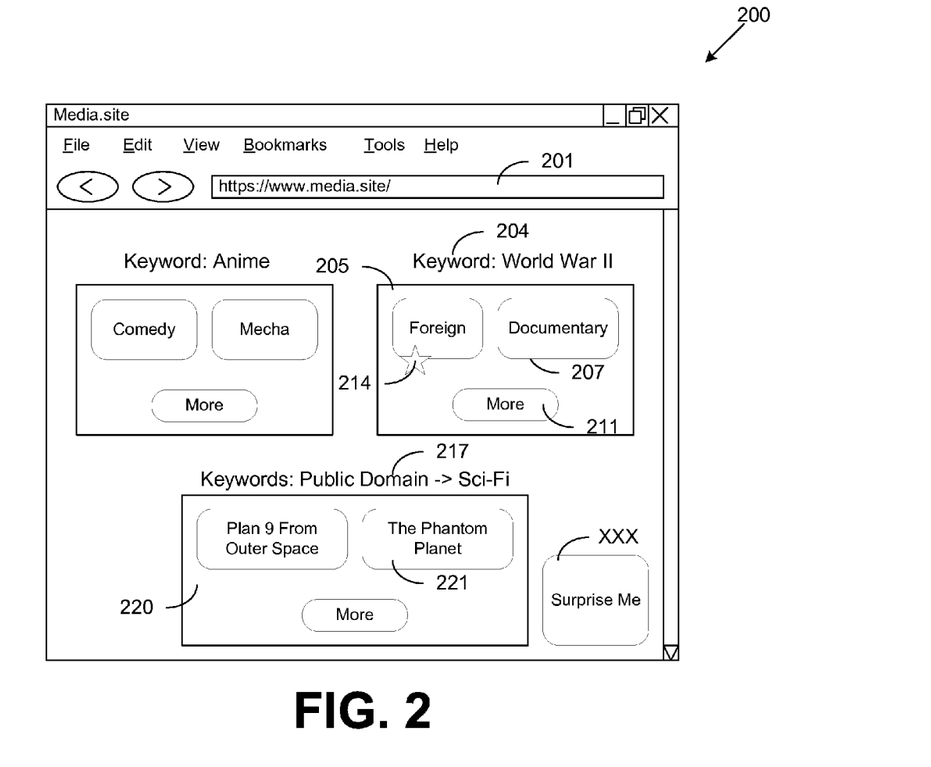
FIGS. 2, 3, and 4 are drawings of example of user interfaces rendered by a client in the networked environment of FIG. 1 according to various embodiments of the present disclosure.

Referring next to FIG. 2, shown is an example user interface 200 encoded by the content discovery application 114 (FIG. 1) for rendering by a client 104 (FIG. 1). The user interface 200 depicted in FIG. 2 may comprise a network page served a network page server application 117 (FIG. 1) for rendering by a browser client application 137 (FIG. 1). In the alternative, the user interface 200 depicted in FIG. 2 may comprise content encoded for rendering by a dedicated client application 137.

Item 201 depicts a Uniform Resource Locator (URL) directed to functionality executed in the computing environment 101 (FIG. 1). Item 204 is an identifier of a previously selected descriptor 124 (FIG. 1) which has been added as the first descriptor 124 in a descriptor sequence 131 (FIG. 1). The descriptor 124 identified in item 204 may have been selected by a user of the client 104, automatically selected by the content discovery application 114, or selected by another approach.

Item 205 is a user interface 200 component comprising graphical elements corresponding to descriptors 124 included in a subset of descriptors 124 communicated to the client 104 by the content discovery application 114. Item 207 is a button corresponding to one of a plurality of descriptors 124 from which the user of the client 104 can select to add to a descriptor sequence 131 identified in item 204. In this example, selecting the button indicated by item 207 adds a descriptor 124 "Documentary" to a descriptor sequence 131 identified in item 204. Therefore, clicking the button identified in item 207 adds the descriptor 124 "Documentary" to the descriptor sequence 131 "World War II," thereby creating a descriptor sequence 131 of "World War II, Documentary."

Item 211 is a button which, when clicked, replaces the graphical elements of item 205 with new graphical elements corresponding to other descriptors 124 in the subset of descriptors 124 communicated to the client 104. This allows a user to iterate through the descriptors 124 without generating graphical representations for all descriptors 124 in the subset. Item 214 is an indicator that the descriptor 124 embodied in the underlying graphical representation was previously selected by another user to be added to the descriptor sequence 131 "World War II."

Item 217 is an indicator of a descriptor sequence 131 comprising the descriptors 124 "Public Domain" and "Sci-Fi." Item 220 is a user interface 200 component comprising graphical elements corresponding to content items 121 (FIG. 1) responsive to the descriptor sequence 131 indicated in item 217. Item 221 is a button graphical element corresponding to a content item 121 for the movie "The Phantom Planet." Selecting the button for item 221 will then associate the content item 121 "The Phantom Planet" with the descriptor sequence 131 identified in item 217. Item 222 is a button which, when clicked, regenerates the descriptors 124 or content items 121 depicted in the user interface 200.

Figure 3:
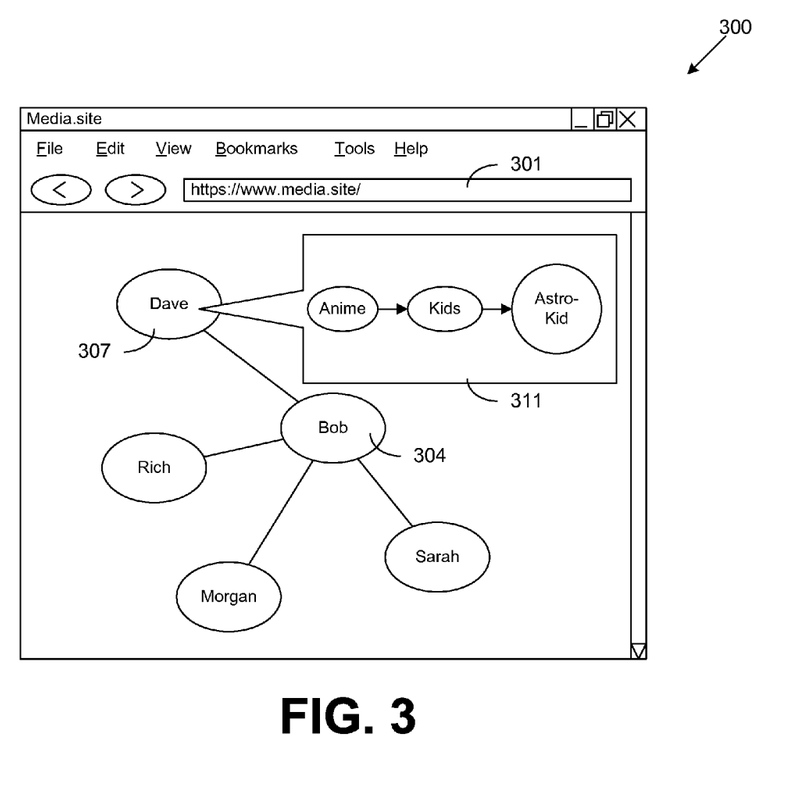

Turning now to FIG. 3, shown is another example user interface 300 encoded by the content discovery application 114 (FIG. 1) for rendering by a client 104 (FIG. 1). The user interface 300 depicted in FIG. 3 may comprise a network page served a network page server application 117 (FIG. 1) for rendering by a browser client application 137 (FIG. 1). In the alternative, the user interface 300 depicted in FIG. 3 may comprise content encoded for rendering by a dedicated client application 137.

Item 301 depicts a Uniform Resource Locator (URL) directed to functionality executed in the computing environment 101 (FIG. 1). Item 304 is a central node of a social graph embodying relationships between the user of a client 104 and other users of the content discovery application 114. The users may be related via an explicit relationship model, such as via a social network, social messaging platform, or by another approach. The users may also be related as having via relationships derived by the content discovery application 114. For example, users may be related by having similar interests indicated by interactions with respect to the content discovery application 114 or by interactions with other data or functionality accessible to the content discovery application 114. The central node depicted in item 304 corresponds to the user of the client 104, to which other nodes representing additional users is connected. Item 307 is a node of the social graph representing a user who is associated with the user of the client 104. Item 307 has been selected by the user of the client 104, initiating a rendering of item 311. Item 311 is a user interface 300 component rendering a graphical representation of a generated descriptor sequence 131 (FIG. 1) and selected content item 121 (FIG. 1) based on selections from the user indicated in item 307.

Figure 4:
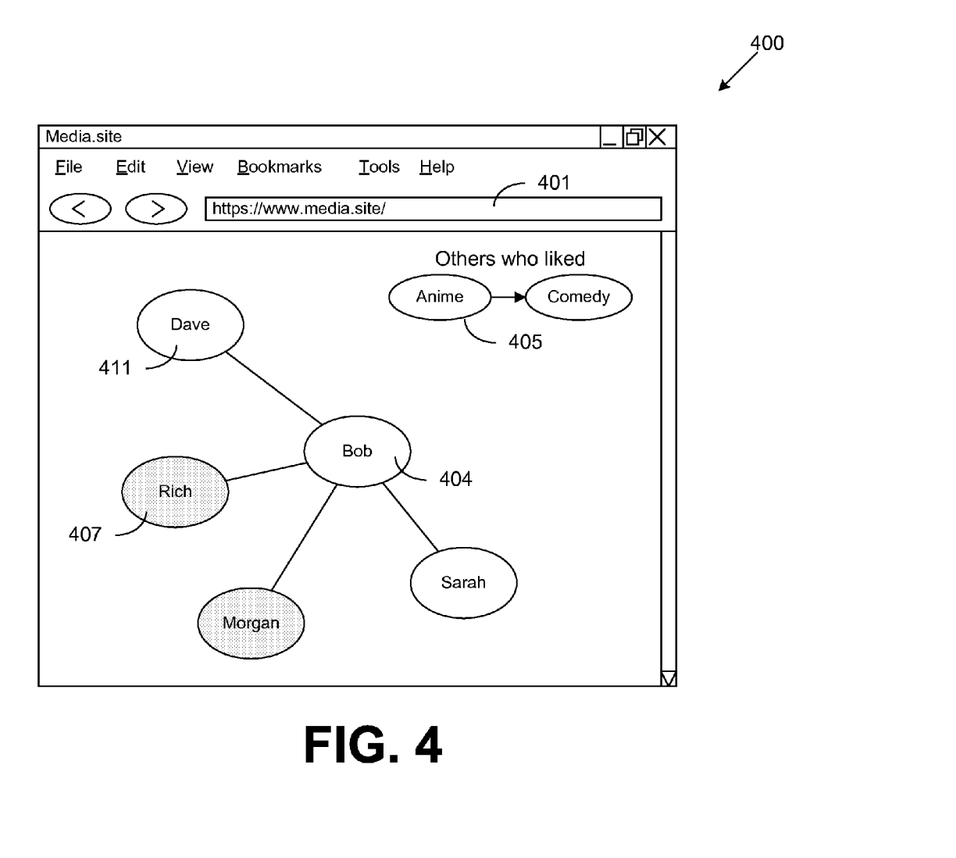

Moving on to FIG. 4, shown is another user interface 400 encoded by the content discovery application 114 (FIG. 1) for rendering by a client 104 (FIG. 1). The user interface 400 depicted in FIG. 4 may comprise a network page served a network page server application 117 (FIG. 1) for rendering by a browser client application 137 (FIG. 1). In the alternative, the user interface 400 depicted in FIG. 4 may comprise content encoded for rendering by a dedicated client application 137.

Item 401 depicts a Uniform Resource Locator (URL) directed to functionality executed in the computing environment 101 (FIG. 1). Item 404 is a central node of a social graph embodying relationships between the user of a client 104 and other users of the content discovery application 114.

The users may be related via an explicit relationship model, such as via a social network, social messaging platform, or by another approach. The users may also be related as having via relationships derived by the content discovery application 114. For example, users may be related by having similar interests indicated by interactions with respect to the content discovery application 114 or by interactions with other data or functionality accessible to the content discovery application 114. The central node depicted in item 404 corresponds to the user of the client 104, to which other nodes representing additional users is connected. Item 405 is a descriptor sequence 131 (FIG. 1) selected by the user of the client 104.

Item 407 is a node of the social graph representing a user who is associated with the user of the client 104. Item 407 is highlighted, indicating that a descriptor sequence 131 associated with the user represented by item 407 is associated with a descriptor sequence 131 which begins with the descriptors 124 (FIG. 1) "Anime" and "Comedy," as indicated in item 405. Item 411 is a node of the social graph representing another user who is associated with the user of the client 104. This indicates that the users indicated in items 404 and 407 share overlapping interests. Item 411 is not highlighted, indicating that no descriptor sequence 131 associated with the user represented by item 411 is associated with a descriptor sequence 131 which begins with the descriptors 124 "Anime" and "Comedy," as indicated in item 405.

Figure 5:
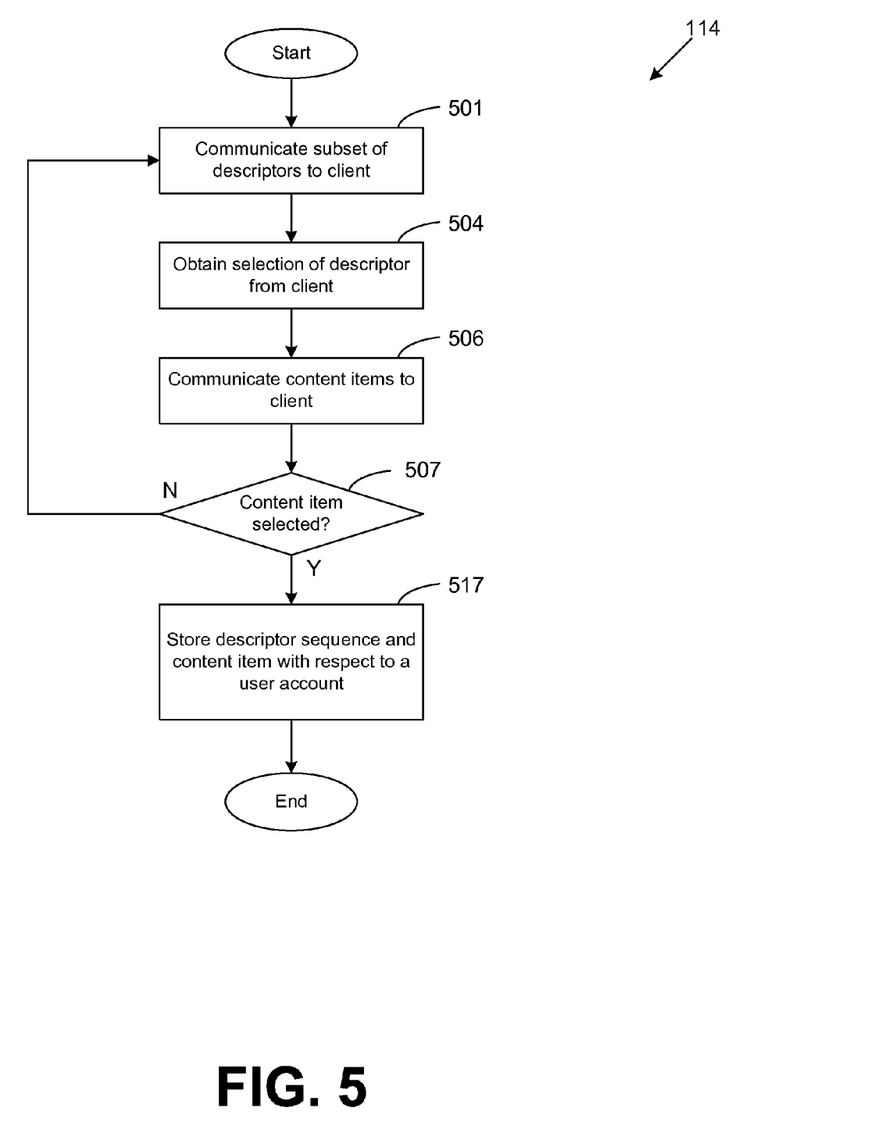
FIGS. 5, 6, and 7 are flowcharts illustrating one example of functionality implemented as portions of a content discovery application executed in a computing environment in the networked environment of FIG. 1 according to various embodiments of the present disclosure.

Referring next to FIG. 5, shown is a flowchart that provides one example of the operation of a portion of the content discovery application 114 according to various embodiments. It is understood that the flowchart of FIG. 5 provides merely an example of the many different types of functional arrangements that may be employed to implement the operation of the portion of the content discovery application 114 as described herein. As an alternative, the flowchart of FIG. 5 may be viewed as depicting an example of steps of a method implemented in the computing environment 101 (FIG. 1) according to one or more embodiments.

Beginning with box 501, the content discovery application 114 communicates a subset of a pool of descriptors 124 (FIG. 1) to a client 104 (FIG. 1). The subset of descriptors 124 may be generated by the content discovery application 114 by calculating a weight for each of the descriptors 124, and selecting those of the descriptors 124 whose weight meets or exceeds a threshold to be included in the subset of descriptors 124.

The weight for a descriptor 124 may calculated based at least in part on a frequency of selection of the descriptor 124 by other users of the content discovery application 114. The weight for a descriptor 124 may also be calculated as a function of a degree of popularity of a list or other content from which the descriptor 124 was generated. Popularity for user-created content may be determined as a function of a user rating, view or browsing counts, social media sharing, links or references to the user-created content, or other data.

The subset of descriptors 124 may also be generated based at least in part on user preferences indicated in a user account 134 (FIG. 1) associated with the client 104. For example, the user preferences may indicate one or more descriptors 124 to be filtered from the subsets of descriptors 124 communicated to the client 104. The subset of descriptors 124 may also be generated by other approaches.

Communicating the subset of descriptor 124 to the client 104 may comprise encoding a user interface for rendering by the client 104. This may comprise generating a network page served by a network page server application 117 (FIG. 1) rendered by a browser client application 137 (FIG. 1). Encoding the user interface may also comprise encoding data for rendering by a dedicated client application 137. The subset of descriptors 124 may also be communicated to the client 104 by another approach.

After communicating the generated subset of descriptors 124 to the client 104, in box 504, the content discovery application 114 obtains a selection of a descriptor 124 included in the subset from the client 104. The selected descriptor is then added to a descriptor sequence 131 (FIG. 1) being generated by the content discovery application 114. In box 506, the content discovery application 114 communicates a subset of content items 121 (FIG. 1) to the client 104 which are responsive to the current state of the descriptor sequence 131. In box 507, the content discovery application 114 determines whether a user of the client has selected a content item 121 from the subset of content items 121.

If the user has not selected a content item 121 in item 507, the process returns to box 501 where the content discovery application 114 continues to communicate subsets of descriptors 124 to the client 104. In subsequent iterations of box 501, as the descriptor sequence 131 comprises at least one descriptor 124, the weights for the descriptors 124 from which the subset is selected may be calculated based at least in part on the current state of the descriptor sequence 131.

This may comprise assigning a higher weight to those descriptors 124 more frequently selected to be the next descriptor 124 in the descriptor sequence 131. For example, a descriptor 124 for "Action" may be more frequently selected than a descriptor 124 for "Cerebral" after having previously added a descriptor 124 "Michael Bay" to a descriptor sequence 131. Therefore, when a descriptor sequence 131 currently being generated comprises the descriptor 124 "Michael Bay," the descriptor 124 "Action" will receive a higher weight than the descriptor 124 "Michael Bay." Weights for descriptors 124 may also be calculated as a function of a descriptor sequence 131 by another approach.

After the content discovery application 114 determines that a user has selected a content item 121 in box 507, the process advances to box 517, where the content discovery application 114 stores the descriptor sequence 131 and the selected content item 121 with respect to a user account 134 associated with the client 104. This may comprise storing the descriptor sequence 131 and the selected content item 121 in a data store 111 (FIG. 1). This may further comprise associating the descriptor sequence and the content item 121 via a relational database or other data structure as can be appreciated.

Figure 6:
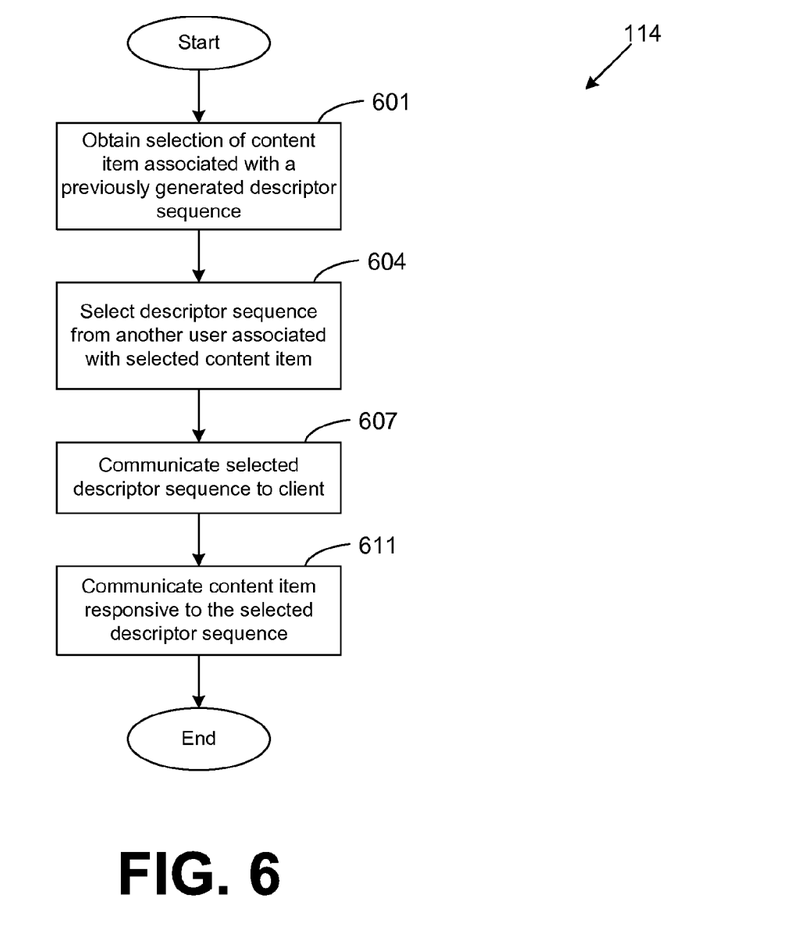

Turning now to FIG. 6, shown is a flowchart that provides one example of the operation of another portion of the content discovery application 114 according to various embodiments. It is understood that the flowchart of FIG. 6 provides merely an example of the many different types of functional arrangements that may be employed to implement the operation of the portion of the content discovery application 114 as described herein. As an alternative, the flowchart of FIG. 6 may be viewed as depicting an example of steps of a method implemented in the computing environment 101 (FIG. 1) according to one or more embodiments.

Beginning with box 601, the content discovery application 114 obtains a selection of a content item 121 from a client 104 (FIG. 1) associated with a descriptor sequence 131 (FIG. 1) previously generated based on inputs from a user associated with the client 104. The content item 121 may be selected from a history of previously generated descriptor sequences 131 and associated selected content items 121, or by another approach.

Next, in box 604, the content discovery application 114 selects a descriptor sequence 131 generated by a user distinct from the user associated with the client 104. The selected descriptor sequence 131 is one which, after being generated, resulted in a selection of the content item 121 also selected by the user associated with the client 104.

After selecting the descriptor sequence 131, the content discovery application 114 communicates the selected descriptor sequence 131 to the client 104. This may comprise encoding for rendering a user interface embodying the selected descriptor sequence 131. The user interface may be encoded as a network page communicated by a network page server application 117 (FIG. 1), as data encoded for rendering by a dedicated client application 137 (FIG. 1), or by another approach. Finally, in box 611, the content discovery application 114 then communicates a content item 121 distinct from the selected content item 121 which is responsive to the selected descriptor sequence 131.

Figure 7:
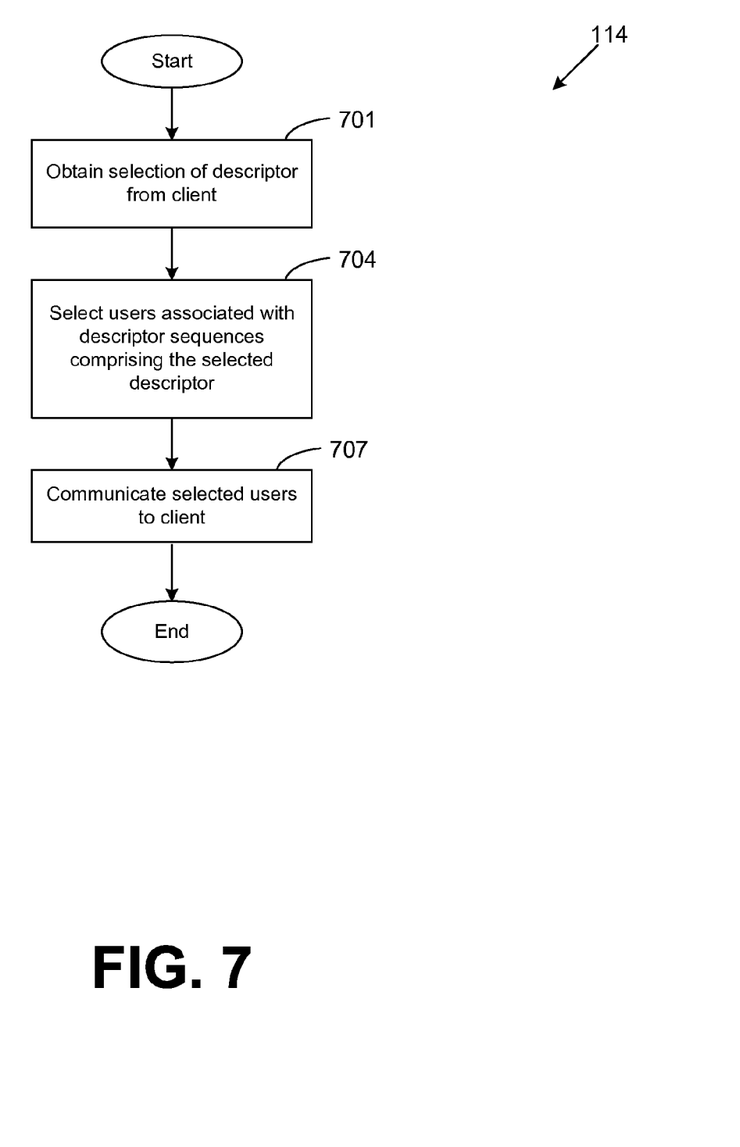

Turning now to FIG. 7, shown is a flowchart that provides one example of the operation of a portion of the content discovery application 114 according to various embodiments. It is understood that the flowchart of FIG. 7 provides merely an example of the many different types of functional arrangements that may be employed to implement the operation of the portion of the content discovery application 114 as described herein. As an alternative, the flowchart of FIG. 7 may be viewed as depicting an example of steps of a method implemented in the computing environment 101 (FIG. 1) according to one or more embodiments.

Beginning with box 701, the content discovery application 114 obtains a selection of a descriptor 124 (FIG. 1) from a client 104. The descriptor 124 may be selected from those descriptors 124 included in descriptor sequences 131 (FIG. 1) associated with a user of the client 104. The descriptor 124 may also be selected from the entirety of the descriptors 124, manually input by a user of the client 104, or selected by another approach.

Next, in box 704, the content discovery application 114 selects users associated with descriptor sequences 131 comprising the selected descriptor 124. The users may be selected from the entirety of users of the content discovery application 114. The users may also be selected from those users associated with the user of the client 104 via a social networking platform, social messaging service, social graph, or other relationship model. Additionally, the users may be selected as a function of user preferences embodied in a respective user account 134 (FIG. 1), privacy settings, a privacy policy, or other data.

In box 707, the selected users are communicated to the client 104 by the content discovery application 114. This may comprise encoding for rendering by the client 104 user interface embodying the selected users. For example, the user interface may comprise a social graph embodying a relationship between the user of the client 104 and the selected users. In some embodiments, the user interface may comprise a social graph embodying all or a subset of the users associated with the user of the client 104 which highlights or otherwise emphasizes the selected users. This distinguishes the selected users from other users associated with the user of the client 104. The selected users may also be communicated to the client 104 by another approach.

Figure 8:
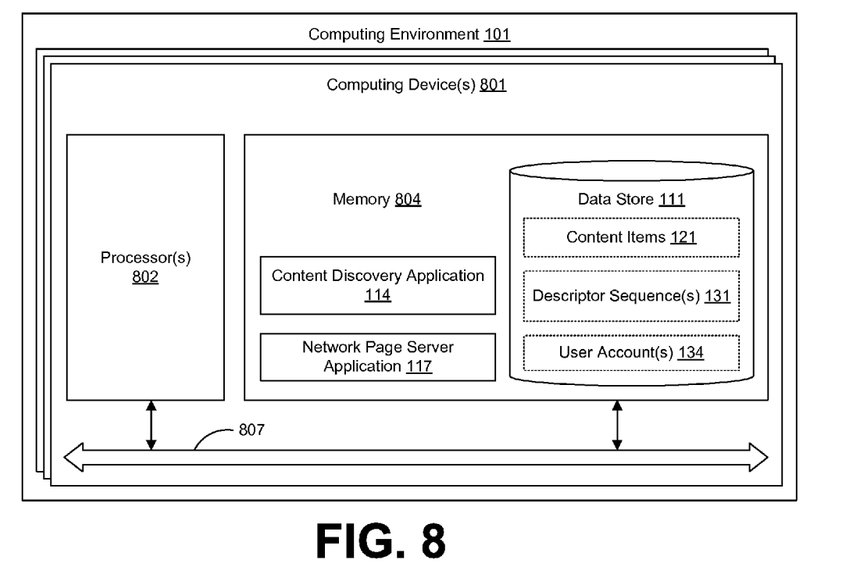
FIG. 8 is a schematic block diagram that provides one example illustration of a computing environment employed in the networked environment of FIG. 1 according to various embodiments of the present disclosure.

With reference to FIG. 8, shown is a schematic block diagram of the computing environment 101 according to an embodiment of the present disclosure. The computing environment 101 includes one or more computing devices 801.

Each computing device 801 includes at least one processor circuit, for example, having a processor 802 and a memory 804, both of which are coupled to a local interface 807. To this end, each computing device 801 may comprise, for example, at least one server computer or like device. The local interface 807 may comprise, for example, a data bus with an accompanying address/control bus or other bus structure as can be appreciated.

Stored in the memory 804 are both data and several components that are executable by the processor 802. In particular, stored in the memory 804 and executable by the processor 802 are a content discovery application 114, a network page server application 117, and potentially other applications. Also stored in the memory 804 may be a data store 111 storing content items 121, descriptor sequences 131, user accounts 134, and other data. In addition, an operating system may be stored in the memory 804 and executable by the processor 802.

It is understood that there may be other applications that are stored in the memory 804 and are executable by the processor 802 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 804 and are executable by the processor 802. In this respect, the term "executable" means a program file that is in a form that can ultimately be run by the processor 802. Examples of executable programs may be, for example, a compiled program that can be translated into machine code in a format that can be loaded into a random access portion of the memory 804 and run by the processor 802, source code that may be expressed in proper format such as object code that is capable of being loaded into a random access portion of the memory 804 and executed by the processor 802, or source code that may be interpreted by another executable program to generate instructions in a random access portion of the memory 804 to be executed by the processor 802, etc. An executable program may be stored in any portion or component of the memory 804 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 804 is defined herein as including both volatile and nonvolatile memory and data storage components. Volatile components are those that do not retain data values upon loss of power. Nonvolatile components are those that retain data upon a loss of power. Thus, the memory 804 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 802 may represent multiple processors 802 and/or multiple processor cores and the memory 804 may represent multiple memories 804 that operate in parallel processing circuits, respectively. In such a case, the local interface 807 may be an appropriate network that facilitates communication between any two of the multiple processors 802, between any processor 802 and any of the memories 804, or between any two of the memories 804, etc. The local interface 807 may comprise additional systems designed to coordinate this communication, including, for example, performing load balancing. The processor 802 may be of electrical or of some other available construction.

Although the content discovery application 114, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5, 6 and 7 show the functionality and operation of an implementation of portions of the content discovery application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 802 in a computer system or other system. The machine code may be converted from the source code, etc. If embodied in hardware, each block may represent a circuit or a number of interconnected circuits to implement the specified logical function(s).

Although the flowcharts of FIGS. 5, 6 and 7 show a specific order of execution, it is understood that the order of execution may differ from that which is depicted. For example, the order of execution of two or more blocks may be scrambled relative to the order shown. Also, two or more blocks shown in succession in FIGS. 5, 6 and 7 may be executed concurrently or with partial concurrence. Further, in some embodiments, one or more of the blocks shown in FIGS. 5, 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content discovery application 114, that comprises software or code can be embodied in any non-transitory computer-readable medium for use by or in connection with an instruction execution system such as, for example, a processor 802 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   generate a first sequence of selected content descriptors by:
      selecting a subset of a plurality of content descriptors based at least in part a frequency of selection of a respective one of the content descriptors and a state of the first sequence of selected content descriptors;
      communicating, to a client associated with one of a plurality of users linked via a social networking service, the subset of a plurality of content descriptors;
      obtaining, from the client, a selection of one of the subset of content descriptors;
      adding the selected one of the subset of content descriptors to the first sequence of selected content descriptors; and
      wherein the communicating, obtaining, and adding are repeatedly performed until a determination by the at least one computing device that a predefined condition is satisfied;
   communicating, to the client, in response to the predefined condition being satisfied, an indication of a first subset of a plurality of content items responsive to the sequence of selected content descriptors, the content items being organized into a taxonomy;
   obtaining, from the client, a selection of one of the subset of content items;

encoding for rendering by the client a user interface comprising a first visualization embodying the users in a social graph;

obtaining from the client a selection of one of the users; and encoding for rendering by the client, a second visualization embodying a second sequence of selected content descriptors associated with the selected one of the users and one of a second subset of content items responsive to the second sequence of selected content descriptors, the one of the second subset of content items having been selected by a second user; and wherein the content descriptors comprise:
a plurality of keywords associated with the content items; and
a plurality of identifiers corresponding to a plurality of nodes of the taxonomy.

2. The non-transitory computer-readable medium of claim 1, wherein the predefined condition comprises a size of the first sequence of selected content descriptors or a size of the first subset of content items exceeding a predefined threshold.

3. A system, comprising:
at least one computing device
comprising at least one processor and a memory storing instructions that, when executed by the at least one processor, cause the at least one computing device to at least:
obtain, from a client, a sequence of selected content descriptors, by:
selecting a subset of a plurality of content descriptors based at least in part on a frequency of selection of a respective one of the content descriptors and a state of the sequence of selected content descriptors;
communicating the subset of the of content descriptors to the client;
obtaining a selection of one of the subset of content descriptors from the client;
adding the selected one of the subset of content descriptors to the sequence of selected content descriptors;
wherein the selecting, communicating, obtaining, and adding are repeatedly performed until a determination by the at least one computing device that a predefined condition is satisfied; and
communicating, to the client, in response to the predefined condition being satisfied, an indication of subset of a plurality of content items responsive to the sequence of selected content descriptors.

4. The system of claim 3, wherein the predefined condition comprises the sequence of selected content descriptors comprising a predefined number of the content descriptors.

5. The system of claim 3, wherein the predefined condition comprises the subset of content items meeting a predefined size threshold.

6. The system of claim 3, wherein the predefined condition comprises a selection of one of the subset of content items.

7. The system of claim 3, wherein the content descriptors comprise a plurality of keywords associated with the content items.

8. The system of claim 3, wherein the content items are organized into a taxonomy, and the content descriptors comprise a plurality of identifiers corresponding to a plurality of nodes in the taxonomy.

9. The system of claim 3, wherein the sequence of selected content descriptors is a first sequence of selected content descriptors, the client is associated with a first user, and wherein communicating the subset of content descriptors comprises:
encoding for rendering by the client a user interface comprising a plurality of user interface elements corresponding to a respective one of the subset of content descriptors;
wherein the user interface elements comprise an indicator responsive to the respective one of the subset of content descriptors being included in a second sequence of selected content descriptors associated with a second user; and
wherein those of the content descriptors included in the second sequence of selected content descriptors sequentially before the respective one of the subset of content descriptors matches at least a portion of a current state of the first sequence of selected content descriptors.

10. The system of claim 3, wherein the client corresponds to one of a plurality of users, and wherein communicating the subset of content items comprises:
encoding for rendering by the client a user interface comprising a plurality of user interface elements corresponding to a respective one of the subset of content items; and
wherein the user interface elements comprise an indicator responsive to the respective one of the subset of content items having been selected by one of the users.

11. The system of claim 3, wherein the client is associated with one of a plurality of users, the sequence of selected content descriptors is one of a plurality of sequences of selected content descriptors associated with the users, and the instructions further cause the at least one computing device to at least:
encode for rendering by the client a user interface comprising a first visualization embodying the users in a social graph; and
encode for rendering, responsive to a selection of one of the users, a second visualization embodying an associated one of the sequences of selected content descriptors.

12. The system of claim 11, wherein sequences of selected content descriptors are associated with a plurality of selected content items, and the second visualization further embodies a respective one of the selected content items.

13. The system of claim 3, wherein the client is associated with a first user, the sequence of selected content descriptors is a first sequence of selected content descriptors, the subset of content items being a first subset of content items, and the instructions further cause the at least one computing device to at least:
obtain, from the client, a selected one of the first subset of content items;
select a second sequence of selected content descriptors associated with a second user, the second user having previously selected the selected one of the first subset of content items responsive to the second sequence of selected content descriptors; and
communicate, to the client a second subset of content items responsive to the second sequence of selected content descriptors.

14. A method, comprising:
selecting, in a computing device, a subset of a plurality of content descriptors based at least in part on a frequency of selection of a respective one of the content descriptors and a state of a sequence of selected content descriptors;

communicating, in the computing device, to a client, the subset of a plurality of content descriptors;

obtaining, in the computing device, from the client, a selection of one of the subset of content descriptors;

adding, in the computing device, the selected one of the subset of content descriptors to the sequence of selected content descriptors;

repeating, in the computing device, the communicating, obtaining, and adding until a determination by the computing device that a predefined condition is satisfied;

communicating, in the computing device, to the client, in response to the predefined condition being satisfied, an indication of subset of a plurality of content items responsive to the sequence of selected content descriptors;

obtaining, in the computing device, from the client, a selection of one of the subset of content items.

15. The method of claim 14, wherein the predefined condition comprises a size of the sequence of selected content descriptors or a size of the subset of content items meeting a predefined threshold.

16. The method of claim 14, wherein the client is associated with a first user, the sequence of selected content descriptors is a first sequence of selected content descriptors, and the method further comprises identifying, in the computing device, to the client, a second user associated with a second sequence of selected content descriptors comprising the selected one of the subset of content descriptors.

17. The method of claim 14, wherein the content descriptors comprise a plurality of keywords curated by a plurality of users.

18. The method of claim 14, wherein the content descriptors comprise a plurality of keywords extracted from a plurality of list titles, the list titles corresponding to a plurality of lists into which the content items are grouped.

19. The method of claim 14, wherein the content items are organized into a taxonomy, and the content descriptors comprise a plurality of identifiers corresponding to a plurality of nodes in the taxonomy.

20. The method of claim 14, wherein the client is associated with one of a plurality of users, the sequence of selected content descriptors is a first sequence of selected content descriptors, the subset of content items is a first subset of content items, and the method further comprises:

encoding, in the computing device, for rendering by the client a user interface comprising a first visualization embodying the users in a social graph;

obtaining, in the computing device, a selection of one of the users; and encoding, in the computing device, for rendering by the client, a second visualization embodying an second sequence of selected content descriptors associated with the selected one of the users and one of a second subset of content items responsive to the second sequence of selected content descriptors selected by the second user.

21. The method of claim 14, wherein the sequence of selected content descriptors is a first sequence of selected content descriptors, the client is associated with a first user, and wherein communicating the subset of content descriptors comprises:

encoding, in the computing device for rendering by the client a user interface comprising a plurality of user interface elements corresponding to a respective one of the subset of content descriptors;

wherein the user interface elements comprise an indicator responsive to the respective one of the subset of content descriptors being included a second sequence of selected content descriptors associated with a second user associated with the first user; and wherein those of the content descriptors included in the second sequence of selected content descriptors sequentially before the respective one of the subset of content descriptors matches at least a portion of a current state of the first sequence of selected content descriptors.

* * * * *